United States Patent [19]
Yonezawa et al.

[11] Patent Number: 5,584,927
[45] Date of Patent: Dec. 17, 1996

[54] HYDRAULIC SUBSTANCE WITH WATER STABLE PARTICLE COATING

[75] Inventors: Toshio Yonezawa; Kenrou Mitsui; Kunio Yanagibashi; Yousaku Ikeo; Tooru Okuno, all of Tokyo; Etsurou Asakura; Hisatsugu Yoshida, both of Saitama-ken; Mitsuo Sato, Tokyo; Mitsuo Kinoshita, Aichi-ken, all of Japan

[73] Assignees: Takenaka Corporation, Osaka; Mitsubishi Materials Corporation; Keihin Ryoko Concrete Industry Corporation, both of Tokyo; Takemoto Oil and Fat Corporation, Aichi-ken, all of Japan

[21] Appl. No.: 281,102

[22] Filed: Jul. 27, 1994

Related U.S. Application Data

[63] Continuation of Ser. No. 950,696, Sep. 25, 1992, abandoned.

[30] Foreign Application Priority Data

Sep. 25, 1991 [JP] Japan ..................... 3-273069

[51] Int. Cl.$^6$ ............................. C04B 7/02; C04B 14/00; C04B 14/06
[52] U.S. Cl. ................. 106/737; 106/713; 106/738; 106/819; 264/122; 428/403; 428/404; 428/688
[58] Field of Search ..................... 106/713, 724, 106/737, 716, 819, 823, 719, 738; 264/122; 427/189, 215; 428/312.2, 404, 688, 403

[56] References Cited

U.S. PATENT DOCUMENTS

| | | | |
|---|---|---|---|
| 4,923,665 | 5/1990 | Andersen et al. | 264/122 |
| 4,933,031 | 6/1990 | Blomberg et al. | 106/819 |
| 4,935,060 | 6/1990 | Dingsoyr | 106/719 |

FOREIGN PATENT DOCUMENTS

| | | |
|---|---|---|
| 60-59182 | 11/1979 | Japan . |
| 2192439 | 9/1989 | Japan . |
| 2131409 | 6/1984 | United Kingdom . |
| WO8000959 | 5/1980 | WIPO . |

*Primary Examiner*—Karl Group
*Assistant Examiner*—Michael Marcheschi
*Attorney, Agent, or Firm*—Banner & Allegretti, Ltd.

[57] ABSTRACT

The hydraulic substance according to the present invention comprises a certain amount of solid particles A (such as portland cement and mixed cement comprising portland cement), an average diameter thereof is 5 to 50 μm, and solid particles B (such as silica fume comprising amorphous silica), an average diameter thereof is less than 1/5 of the particles A, and the particles B have such characteristic that they cohere to the surfaces of the particles A in water, and the quantity of the particles B is arranged such that they cover at least to make a single layer over the whole or part of surfaces of the particles A to cover whole or part of surfaces of particles A with particles B at least with a single layer, and the quantity of the water is arranged such that it is less than 60% of the total amount of the particles A and particles B.

10 Claims, 10 Drawing Sheets

HYDRAULIC SUBSTANCE WITH WATER STABLE PARTICLE COATING

This application is a continuation of U.S. application Ser. No. 07/950,696 filed Sep. 25, 1992 now abandoned.

THE BACKGROUND OF THE INVENTION

The present invention relates to hydraulic substance applied as construction material such as concrete, mortar and grout.

The hydraulic substance such as concrete, mortar and grout are produced by mixing and stiring hydraulic particles such as portland cement, fly ash and blast furnace slag particles with water, aggregate and a small amount of chemical admixture. The diameter of the hydraulic particle mentioned above is about 1~199 μm and an average diameter thereof is about 10~20 μm.

The mechanical properties and the durability of the hydraulic substance hardened is normally determined by the ratio of water and hydraulic particles, and the more the ratio is smaller, the more the mechanical properties and the durability thereof improve. When aggregates such as sand and stones are included in the hydraulic substance, the mechanical properties and the durability thereof after hardened are determined not only by the ratio of the water and the particles but also by a quantity of the water and the particles (the amount of the paste) and a quantity of the aggregates, and generally the ratio thereof is smaller, the more the characteristics thereof improves.

However, the more the ratio of the water and the hydraulic particles is smaller, and the more the ratio of the amount of the paste and the aggregates is smaller, the fluidity of the hydraulic substance deteriorates. Therefore, a method of improving the mechanical characteristics and the durability of the hydraulic substance by lowering the ratio of the water against the particles or lowering the ratio of an amount of the paste against the aggeregate is limited to a limiting point of the fluidity of the hydraulic substance when the fluidity required for construction is concerned.

In other words, the improvement of the quality of the hydraulic substance and the fluidity thereof are inseparably related. To resolve the problems the hydraulic substance consist of, a prior art discloses such idea that cohered cement particles, with a mixture of substance such as water-reducer, air-entraining (AE) water-reducer, high-range water-reducer, high-range AE water-reducer, are dispersed to improve the fluidity of the hydraulic substance.

Another prior art discloses such idea that fine particles more than one order smaller than hydraulic substance are dispersed evenly without a cohesion between the hydraulic particles such as cement to improve the fluidity of the hydraulic substance, and the mechanical strength and the durability thereof are also improved (Japanese Patent Publication No. 60-59182).

Further, another prior art discloses such idea that particles of cement, one of the hydraulic particles, are collided each other in a high-speed air current, removing the edges of the particles and forming thereof globular to improve the fluidity of the cement (Japanese Patent Provisional Publication No. 2-192439).

In this prior art, for the purpose of activating the reactions of the cement and of obtaining surface reactivity dissimilar to the cement, when the globular cement is to be produced in the high-speed air current, fine particles such as silica fume are applied in the high-speed air current to coat the cement with the silica fume.

In the same prior art, there are number of problems.

That is, to improve the fluidity of the hydraulic substance, applying the high-range water-reducer or the high-range AE water-reducer for dispersing the cohered hydraulic particles is considerably effective. However, to further improve the fluidity of the hydraulic substance, beside the application of the high-range water reducer, other technics are required.

The technique of evenly dispersing the fine particles, which are more than one order smaller than the hydraulic particles, without forming a cohesion between the hydraulic particles brings such effect that when the hydraulic particles deform, the shearing resistance between the particles can be reduced, but it increases the viscosity of the water between the hydraulic particles and limits the improvement of the fluidity. Further, dispersing the fine particles evenly without forming a cohesion between the hydraulic particles is extremely difficult; nearly impossible.

The technique of making globule cement is effective but it requires a high energy cost.

The globular cement coated with the fine particles is effective when the fluidity of the hydraulic substance is concerned, but it requires a cost for making up the cement globular and the cost of preparing the fine particles, which decreases the economical efficiency. Further, the cement coated with the fine particles has to keep its same condition when it is mixed with water, however, it is not clear whether or not the condition of the cement coated with the fine particles, which is performed in the high-speed air current, can be kept still the same after it is mixed with the water. It is essential that the coating of hydraulic particles by fine particles in water is assured.

Therefore, the object of the present invention is to resolve the problems the hydraulic substance has.

DETAILED DESCRIPTION OF THE INVENTION

To accomplish the object described above, hydraulic substance according to the present invention comprises a certain amount of solid particles A (such as portland cement and mixed cement comprising portland cement), an average diameter thereof is 5 to 50 μm, and solid particles B (such as silica fume comprising amorphous silica), an average diameter thereof is less than 1/5 of the particles A, and the particles B have such characteristic that they cohere to the surfaces of the particles A in water, and the amount of the particles B is arranged such that they fully cover at least to make a single layer over the whole or part of surfaces of the particles A to cover whole or part of surfaces of particles A with particles B at least with a single layer, and the amount of the water is arranged such that it is less than 60% of the total amount of the particles A and particles B.

The particles B, besides making coating layers over the surfaces of the particles A, may position between the particles A, with or without being dispersed evenly or some being cohered each other.

A high-range water reducer may be applied to obtain a desirable fluidity to disperse the particles A and particles B.

In the hydraulic substance according to the present invention, substance C (such as sand, stones, artificial lightweight aggregate, inorganic formed substance, inorganic sintered substance, plastic, organic formed substance, hollow plastic, inorganic fiber, organic fiber, metal fiber) may be applied.

In the hydraulic substance according to the present invention, it performs a high efficiency when the particles A comprises 20 weight % or more of portland cement.

In the hydraulic substance according to the present invention, it performs a higher efficiency when the particles B comprises 60 weight % or more of amorphous silica, which is silica fume and the specific surface thereof is 50,000~1,000,000 $cm^2/g$.

In the silica fume, the dispersion thereof is easily done and the efficiency thereof is considerably high in such case that 0.2 gram of silica fume and 250 ml of distilled water are applied toghether in an ultrasonic wave dispersion tub (which is attached to a CILAS company made laser difraction type particle distribution measurement device model 715, the generating power thereof is 150 watt and the frequecy thereof is 20 kHz), and when ultrasonic wave is applied to them for 12 minutes, more than 30 weight % of the silica fume is dispersed to particles of less than 1 μm in diameter.

Figure 1:
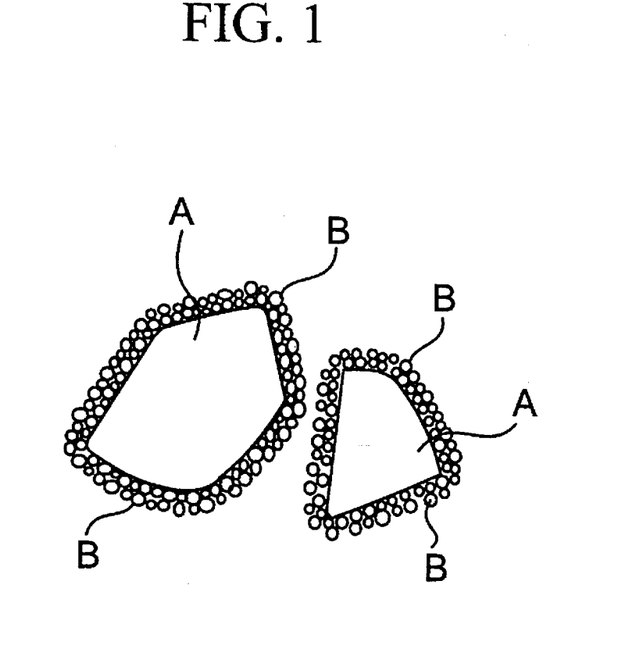
FIG. 1 shows a condition according to the present invention that a particle A is wholly coated with fine particles B.

In the hydraulic substance formed as described above, when the solid particles A such as cement and the solid particles B, the diameter thereof is less than 1/5 of the particles A, are mixed and stirred, if the mixture is appropriate, the solid particles B cohere to the whole or part of the surfaces of the solid particles A, making coating layers over the solid particles A. Whether or not such coating layer is properly perfomed depends on the charges of the surfaces of the particles and the force generated between the particles, so that it is necessary to mix the particles A and the particles B in a suitable manner. In case the solid particles A are grinded ones such as cement, the shapes of the particles are angular, however, as shown in FIG. 1, by coating the particles A with the particles B, the particles A become less angular and the fluidity thereof improves. The particles B cohered to the surfaces of the particles A function like bearings, so that the shearing resistance generated by contact of the particles A are reduced. Depending on the charges generated on the surfaces of the particles or the layers, electrical repulsive forces contributes the improvement of the fluidity.

Figure 2:
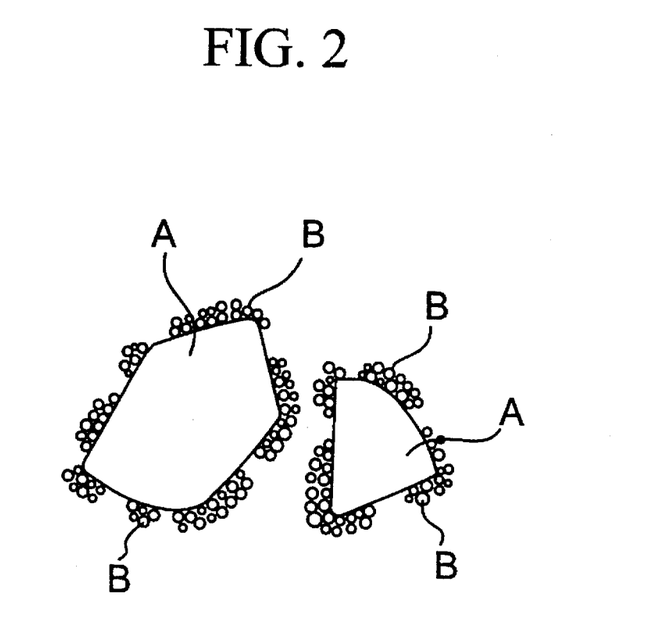
FIG. 2 shows a condition according to the present invention that a particle A is partially coated with fine particles B.

The reduction of the shearing resistance generated by contanct of the particles A, which is caused by the so-called bearing effect and the electrical repulsive forces, occures even when the particles B unevenly or partially cohere to the particles A making uncoated part over the surfaces thereof, as shown in FIG. 2. Therefore, although it is desirable that the surfaces of the particles A are wholly coated by the particles B, the coating layer over the surface of the particle A can be uneven and even uncoated part can be allowed to exist.

To expect an improvement of the fluidity by coating the particles A by particles B, it is required that the fluidity of the hydraulic substance depends on the contact resistance between the particles. Therefore, this effect can be expected only from hydraulic substance in which an amount of the water comprised is less than certain amount. The characteristic of the fluidity of the hydraulic substance is normally determined by yield value and plastic viscosity, however, the plastic viscosity under a certain yield value, when an amount of the water is less than 60% of the total weight of the particles A and particles B, decreases and the fluidity thereof improves because of an effect of coating according to the present invention. Marked improvement of the fluidity according to the present invention is observed when the amount of the water is smaller as such that the amount of the water is less than 40% of the solid weight. However, the amount of the water which brings a good effect depends on a mixture of the particles A and the particles B, so that a suitable amount of the water should be determined by tests depending on a purpose.

As described above, according to the present invention, the solid particles A and the solid particles B are properly selected and are stirred to mix, producing the particles A coated with the particles B, which improves the fluidity and the efficiency of the hydraulic substance.

A size of the solid particles A concerned in the present invention is a normal size as hydraulic substance utilized for constructions, that is an average diameter thereof is about 5~50 μm. The solid particles B are required to cohere to the surfaces of the particles A, so that the average diameter of particles B should be less than 1/5, preferably 1/10 average diameter of the particles A.

Further, an amount of the solid particles B should be an amount needed to coat the particles A, that is, the amount of the particles B should be the amount that can make at least a single coating layer over the whole or part of the surfaces of the particles A. For example, suppose, a diameter of the particles A is 20 μm and a particle size thereof is definite, and a diameter of particles B is 0.2 μm and a particle size thereof is also definite, the amount of the particles B required to coat a layer over the particles A is about 3~3.5% of volume of particles A.

When the surfaces of the particles A are not wholly coated by the particles B, a certain quantity of the particles B are required to generate the so-called ball bearing effect and the effect of the electrical repulsive forces. It is difficult to theoretically figure out the quantity of the particles B, but according to an experimental test, the quantity of the particles B may be more than about ⅓ of and preferably equal to the quantity that can make a single coating layer over the whole surfaces of the particles A.

For stiring and mixing the particles A and the particles B, a suitable device such as a concrete mixer or a special high-speed mixer should be employed.

Figure 3:
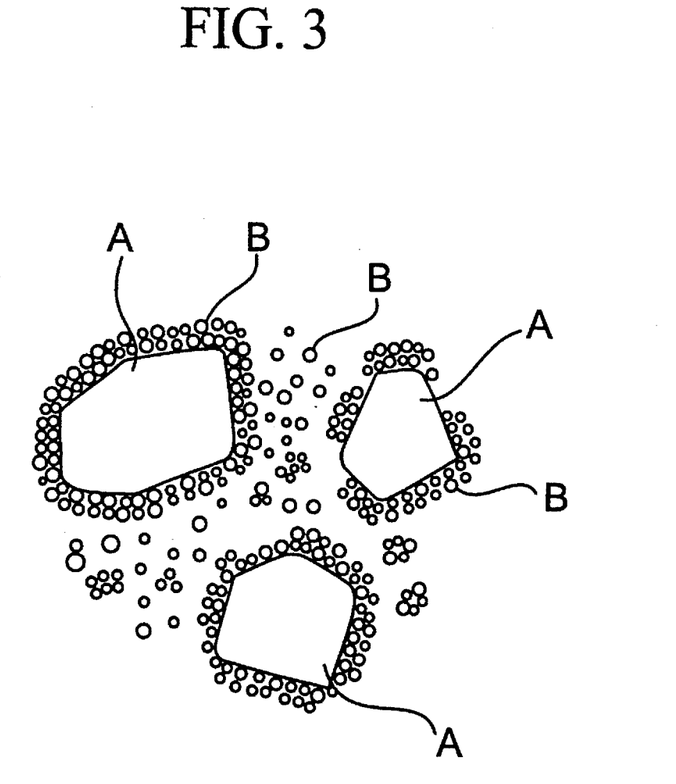
FIG. 3 shows a condition according to the present invention that a particle A is coated with fine particles B, some fine particles B being dispersed and cohered between the particles A.

When fine particles (corpuscles) are dispersed between larger particles, the tiny particles have effects of reducing shearing deformation resistance of the larger particles, improving the fluidity thereof, and of increasing viscosity of the water positioned between the larger particles, decreasing the fluidity thereof. Therefore, it is effective to position the fine particles (corpuscles) in between the larger particles, as such that they reduce the shearing deformation resistance of the larger particles, to improve the fluidity of the hydraulic substance. It is clear that by coating the particles A by fine particles (corpuscles) B and by positioning the particles B between the particles A, the fluidity of the particles can be improved. FIG. 3 shows hydraulic substance in such condition.

Although, particles B should preferably be dispersed evenly in a gap between particles A, some or all of them may cohere with each other as far as they are effective enough to maintain the fluidity of the particles A. Theoretically it is hard to define the quantity of particles B which disperse in a gap between particles A, so that such quantity should be determined by a test according to a type of particle. According to an experimental test, in many cases, when a total volume of particles B cohered to the surfaces of particles A and that dispersed in a gap between particles A exceeds the volume which is equivalent to make a single layer over the whole surfaces of particles A, the particles B effectively perform to improve fluidity of the particles A.

To improve the fluidity of the hydraulic substance, applying high-range water reducer to disperse the cohered particles is considerably effective. The high-range water reducer is highly effective in the present invention in which the particles A are coated by particles B. The high-range water reducer disperse the particles A and at the same time it disperse the particles B, so that the dispersed particles B cohere the surfaces of the particles A as they are stirred and mixed in the water, making solid coating layers over the particles A with particles B. If the cohered particles B, the fine particles, cannot be dispersed by an outer force and maintain their cohered conditions, the particles B would not cohere to the particles A even though they are stirred, so that the fluidity of the particles A could be reduced depending on a size of cohered particles B.

It is difficult to determine an amount of the high-range water reducer being applied, so that it should be determined by a test considering the amount of the particles A and the particles B required to cohere to the surfaces of the particles A, depending on desired fluidity of the hydraulic substance.

According to the present invention, by stirring and mixing the particles A and the particles B, the particles A with coating layers of particles B are produced, however, the substance C which is larger than the particles A can be applied to improve the mechanical and economical efficiency of the hydraulic substance. If the substance C is sand, then the hydarulic substance will be mortar, and if the substance C is sand and stones, then the hydraulic substance will be concrete. According to the present invention, substance C other than the sand and stones can be applied to make the hydraulic substance lighter or to improve the forming efficiency thereof.

The portland cement can be coated by suitable particles B according to the present invention. That is, the portland cement can be applied as the particles A of the present invention. The mixed cement can be determined as the solid particles A as far as it contains the portland cement therein. However, when the amount of the portland cement contained in the mixed cement is too small, it might not be able to gain the effects according to the present invention, so that the amount of the portland cement therein should be arranged at least more than 20%, desirably more than 30%.

The fine particles comprising amorphous silica such as silica fume can be applied as the particles B, according to the present invention, to the appropriately selected particles A, and they cohere to the surfaces of the particles A which are five to ten times larger than the particles B. When the particles B are fine particles comprising amorphous silica, the portland cement can be one of the appropriate solid particles A for them, which can be effectively coated by the fine particles.

By stirring and mixing the silica fume (solid particles B) and the portland cement, one of the solid particles A, the surfaces of the cement particles are coated by the silica fume and some of the silica fume position between the cement particles, some being dispersed evenly and some cohered each other. As an effect of this, the fluidity of the hydraulic substance comprising the cement and the silica fume is highly improved. The silica fume reacts to alkali such as $Ca(OH)_2$ produced by hydration of the cement, and it fills up the gaps of the cement hydrate, so that it improves the strength and the durability of the hardened cement. However, when the amount of $S_i$ is too small, the effect of the silic fume to improve the strength is limited. Therefore, to expect the effect to improve the strenght from the silica fume, the content of $S_i O_2$ should be arranged more than 60% and preferably more than 70%.

In case that the particles A are the portland cement, and when the specific surface of the silica fume, the solid particles B, is too large, it is difficult to disperse the cohered silica fume and to coat the cement properly. On the other hand, in case that the specific surface of the silica fume is too small, it does not properly cohere to the surface of the cement to make a coating layer of the cement, and further it reacts to the cement hydrate and decreases its effect to improve the efficiency of the hardened cement. Therefore, the specific surface of the silica fume should be within an certain extent. The extent of the specific surface should be in between 50,000 $cm^2/g$~1,000,000 $cm^2/g$ and preferably in between 100,000 $cm^2/g$~500,000 $cm^2/g$.

The silica fume, which is produced via processes of evaporation and quick refrigeration of $S_i O_2$ like in the producing process of silicon metal or ferrosilicon, is collected by a bag filter, and the primary particle thereof is about 0.1~0.5 μm in diameter, however, it coheres each other by the time it is collected, so that the average nominal diameter thereof then reaches to scores of 10 μm. A portion of the silica fume is densified to improve the shipping efficiency by increasing the cohesion. Therefore, when the silica fume is concerned as the particles B performing a high efficiency according to the present invention, it should preferably be such that the efficiency of the dispersion thereof is high, and after the dispersion, it is able to coat the particles A effectively.

According to the researches done by the inventors of the present invention, the determination of the quality of the silica fume is defined by such test that the quality thereof is determined by an quantity of the silica fume that is dispersed into less than 1 μm in diameter after receiving ultrasonic wave for a certain period of time. When 0.2 gram of silica fume and 250 ml of distilled water are applied toghether in an ultrasonic wave dispersion tub, which is attached to a CILAS company made laser difraction type particle distribution measurement device model 715, the generating power thereof is 150 watt and the frequecy thereof is 20 kHz, and ultrasonic wave is applied to them for 12 minutes, and thereafter if more than 30 weight % and preferably more than 50 weight % of the silica fume is dispersed to particles of less than 1 μm in diameter, then it can be determined that such silica fume can be dispersed with considerably little quantity of energy and it is effective as the particles B according to the present invention. However, even if the dispersed particles of less than 1 μm in diameter is less than 30 weight %, it may be utilized as the particles B of the present invention by applying extremely high stirring energy or by stirring for a long time. In such case, the energy and the cost of the productivity increase.

PREFERRED EMBODIMENT OF THE INVENTION

The preferred embodiment of the present invention is disclosed below. However, the present invention is not limited to the range disclosed in the preferred embodiment.

The concrete as shown in the diagram below is prepared by applying the portland cement as the solid particles A and undensified silica fume as the solid particles B, and improvement of the fluidity of the concrete and the characteristic of mechanical strength thereof are studied, and further the coating condition of the cement is examined.

Figure 4:
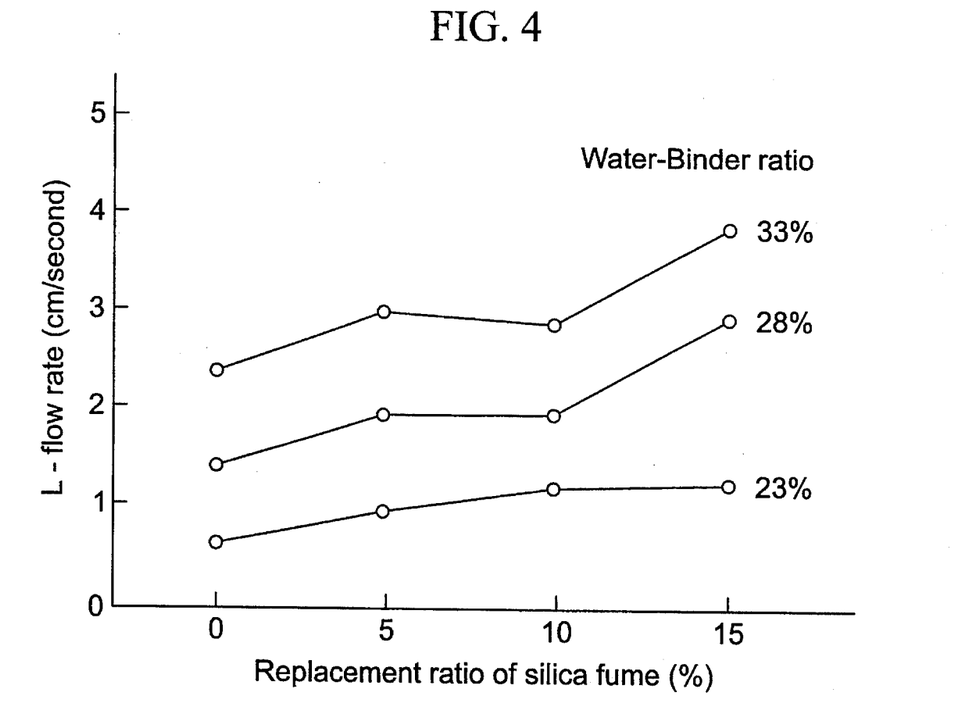
FIG. 4 shows a graph that indicates an interrelation between the L-flow speed measured by a L-type flow test and the displacement of silica fume.

FIG. 4 shows a interrelation of a L-flow rate and a ratio of silica fume replacement of concrete, which comprises cement being coated with the silica fume according to the present invention and the water-binder ratio thereof are 23%, 28% and 33%. The L-flow rate is measured by the L-type-flow test method disclosed by the same applicants in Japanese Provisional Publications No. 1-297528 and 1-297529. Faster L-flow rate indicates lower viscosity of the concrete. That is, the higher the L-flow rate is, the lower the viscosity of the concrete is.

FIG. 4 indicates that as the quantity of the silica fume increases, the L-flow rate increases, lowering the viscosity of the concrete. That is, it indicates that by applying the cement and the silica fume according to the present invention, the fluidity of the concrete improves.

Figure 5:
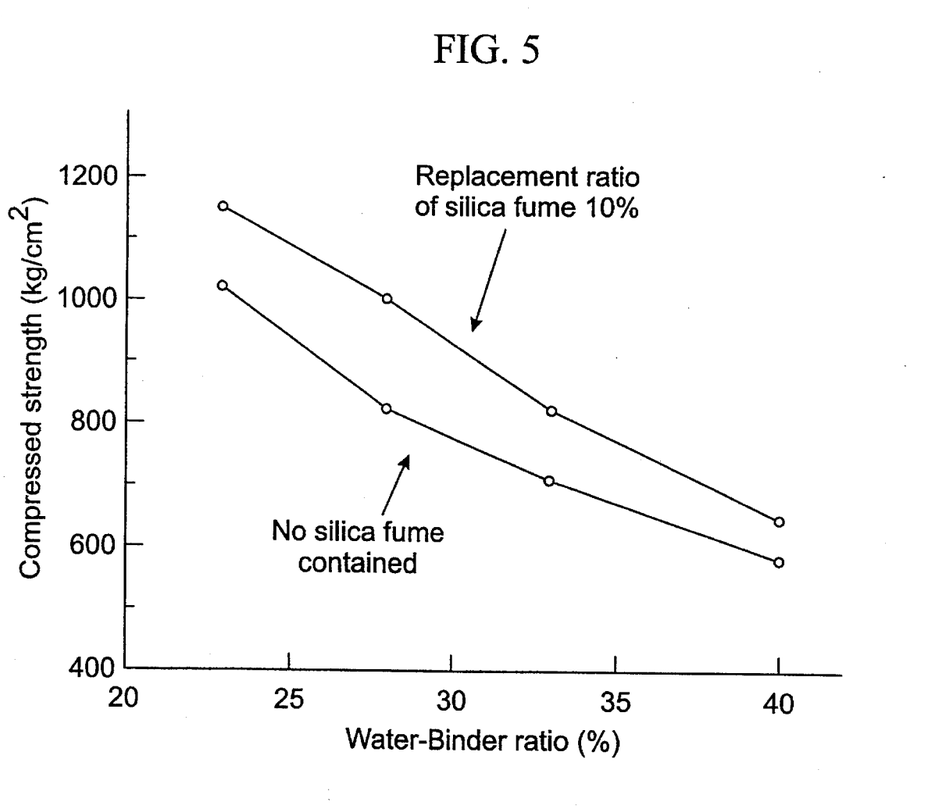
FIG. 5 shows an interrelation between the compressive strength and the ratio of combined substance with water.

FIG. 5 shows an interrelation of concrete composed of cement coated with the silica fume and concrete without coating in compressive strength and water-binder ratios. By applying the cement and the silica fume according to the present invention, it is clear that the compressive strength improves.

As described above, by stirring and mixing the cement and the silica fume in the water and coating the cement with the silica fume, the fluidity and the characterisitc of mechanical strength of the concreate improve.

The condition that the cement in the concrete described above is coated by the silica fume is determined by a test.

Figure 6:
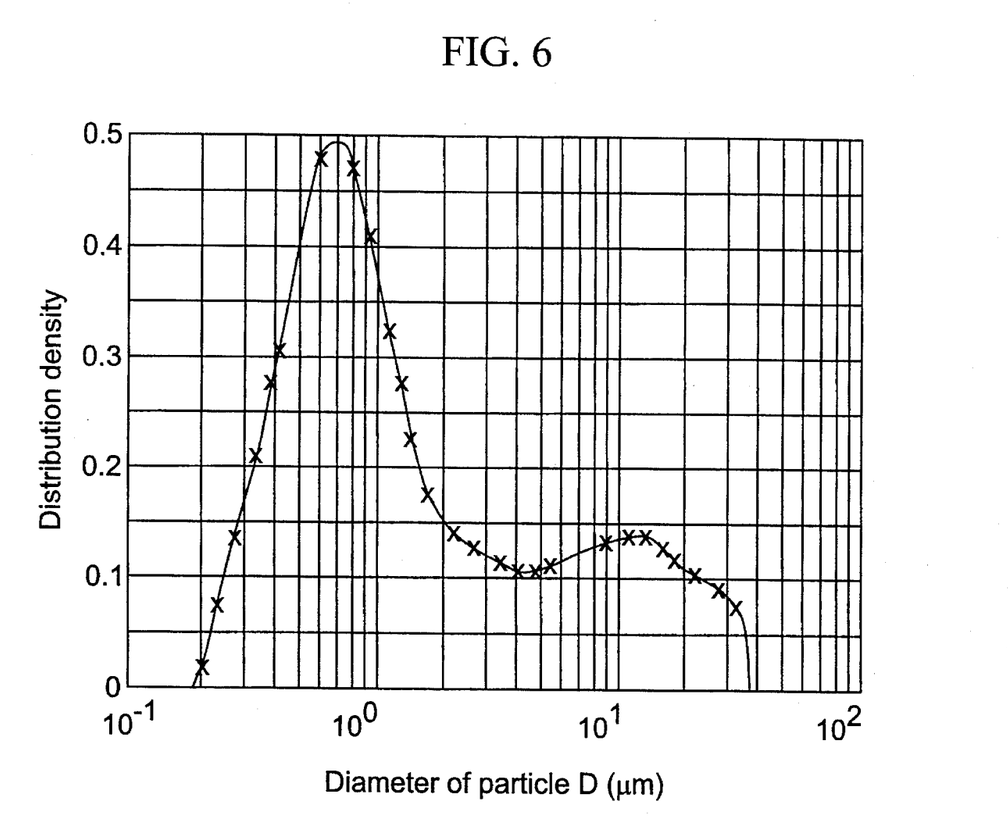
FIG. 6 shows a distribution of particles of silica fume depending on its size.

FIG. 6 shows a distribution of particles in size of silica fume, which is determined by a lazor difraction type device

| mix. No. | water-binder ratio (%) | slump (cm) | air content (%) | sand percent. (%) | unit content (kg/m³) | | | |
|---|---|---|---|---|---|---|---|---|
| | | | | | water | binder | sand | crushed stone |
| 1 | 23 | 23 | 1.5 | 38.5 | 150 | 653 | 618 | 1020 |
| 2 | 28 | 23 | 1.5 | 40.0 | 150 | 535 | 683 | 1059 |
| 3 | 33 | 23 | 1.5 | 41.5 | 150 | 454 | 739 | 1075 |
| 4 | 40 | 23 | 1.5 | 45.0 | 150 | 375 | 832 | 1051 |

The silica fume (SF) is applied by a weight ratio of the cement (C). The displacement ratio of 10% means that value of SF/(C+SF) is 10%. The increase of the paste caused by the displacement of the silica fume is settled by the aggregate. However, under the same water-binder ratio, the sand percentage is arranged stable. The slump 23 cm is kept by arranging a quantity of the high-range AE water reducer being applied. The applied substance are shown below.

Cement: fly ash cement B-type (the specific gravity is 2.97)

Sand: pit sand, the specific gravity thereof is 2.61 and the absorption thereof is 1.53%.

Crushed stones: crushed limestone, the specific gravity thereof is 2.70 and the absorption thereof is 0.38%.

Water: tap water

High-range AE water reducer: the main content thereof is copolymer including special sulfone radical and carboxyl radical (Chupole HP-11).

Silica fume: the specific gravity 2.35, the specific surface 14.1 m²/g, quantity of $S_iO_2$=93.8%, quantity of carbon=0.78%, water content=0.40%, ignition loss=2.76%

To mix the concrete, a pan-type mixer with a volume of 50 litter is selected, and all the substance are stirred therein for two minuties.

for measuring distribution of particles (the measurement range thereof is 0.1–35 μm), in such condition that 0.1 gram of silica fume is applied in a beaker with 100 cc water therein, and ultrasonic wave is applied for a minute by a 600 watt homogenizer (the frequency thereof is 20 KHz, the amplitude of the tip thereof is 30 μm, the diameter of the tip is 36 mm). The peak thereof is 0.7 μm. The small peak of 10 μm seem to indicate that a portion of the primary particles cohere each other.

The distribution density shown in the vertical axis is defined by the formula below.

The distribution density=dv/d(lnD)

v: the volume ratio of the particles shorter than D in diameter.

D: diameter of particle ln: natural logarithmic

Figure 7:
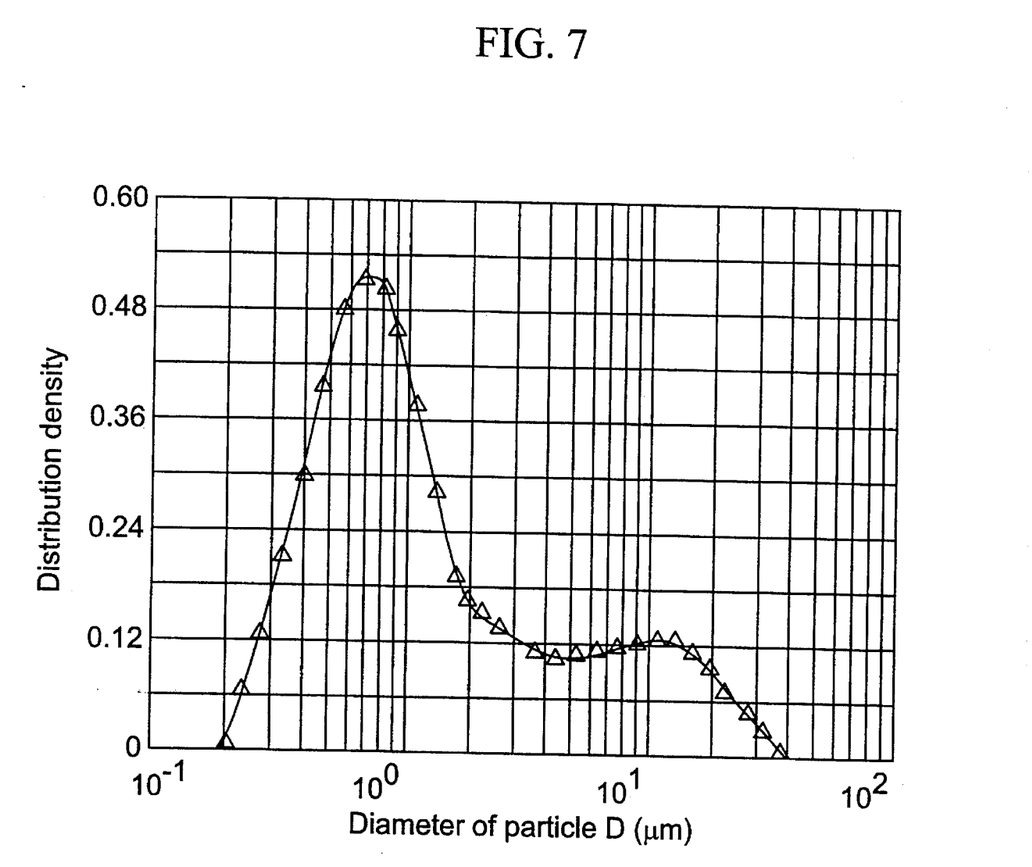
FIG. 7 shows a distribution of particles of silica fume after applying ultrasonic wave in cement extraction liquid.

FIG. 7 shows a test result in which the water in the beaker is extracted from a cement paste, 60% thereof is water and the Pest is cement, and the result remains almost similar to that shown in FIG. 6.

Figure 8:
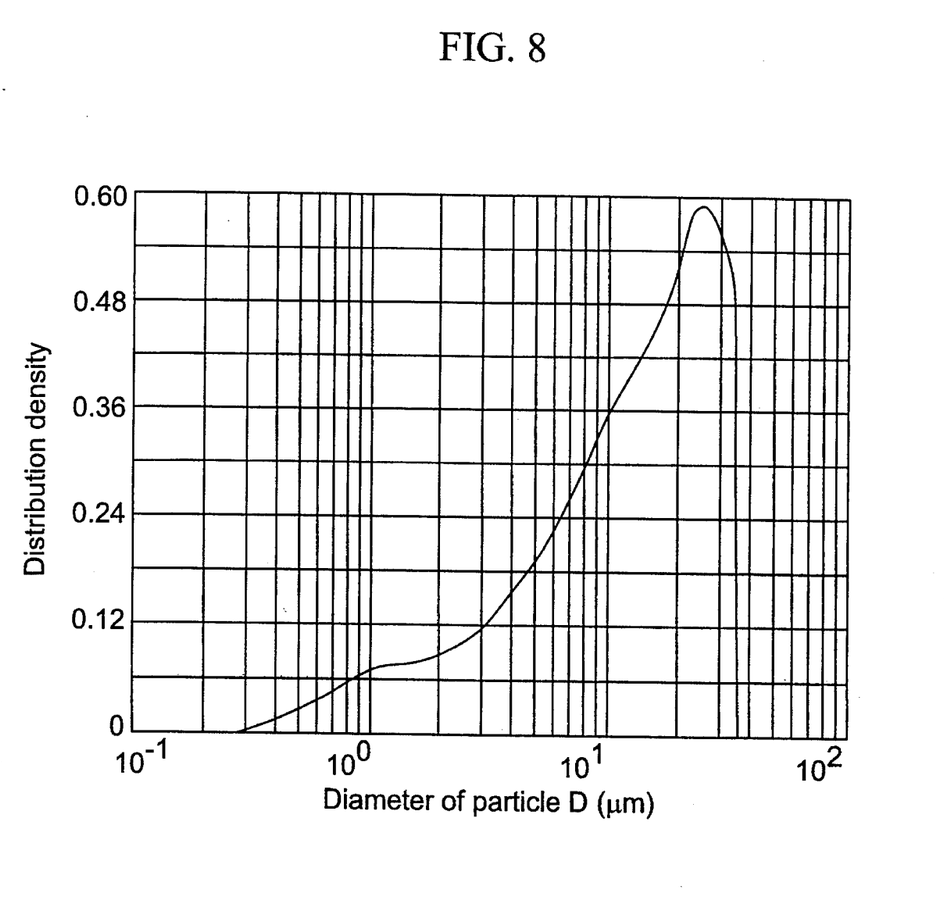
FIG. 8 shows a distribution of particles of cement.

FIG. 8 shows an another distribution of particles in size, which is examined in such a way that 0.15 gram of cement is applied in a beaker filled with 100 cc of water, and ultrasonic wave is applied thereto by a 600 watt homogenizer, and the distribution of the particles are examined.

The particles are distributed in a range of 0.3~35 μm. 35 μm is the highest point the device can measure, but according to a measurement examined by a different device, 10~15% exceeded 35 μm.

Figure 9:
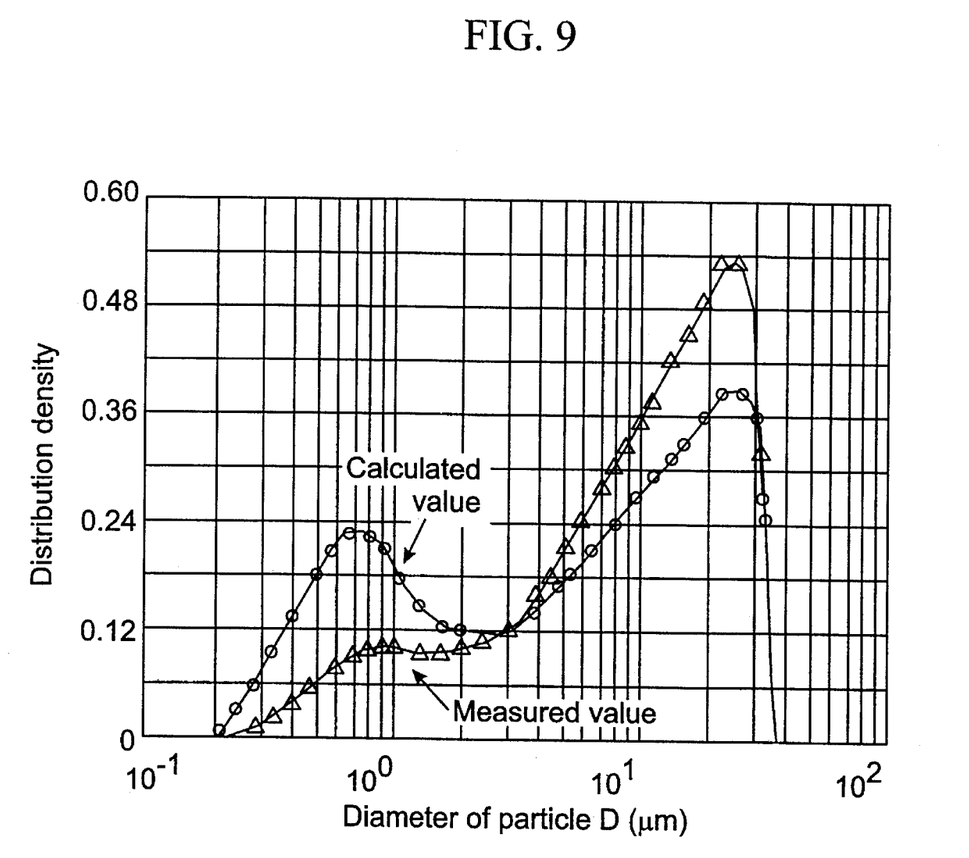
FIG. 9 shows a distribution of particles of cement and silica fume, with the weight ratio of 7 to 3.

FIG. 9 shows a test result which is measured as such that 0.15 gram of cement and silica fume, the ratio thereof is 7 to 3, is applied in the beaker, and similarly the ultrasonive wave is applied thereto. Particles less than 1 μm in diameter are much less noticeable comparing the mixture of that of shown FIG. 8 and FIG. 6. A dashed line in FIG. 9 indicates particle size of the mixed substance of cement and silica fume at the ratio of 7 to 3 determined by calculation based on FIG. 8 and FIG. 6. According to the distribution of particle size, correction is done for the cement over 35 μm.

If the cement and the silica fume are dispersed as each of them normally does, the mixed substance thereof should indicate the line similar to the dashed line in FIG. 9. However, the mixed substance in fact is determined as shown by the solid line, which indicates that either the silica fume is cohered to the surface of the cement and coating thereto, or the silica fume forms cohered particles similar to the cement in size. However, the ultrasonic wave applied to the mixed substance is similar to the one applied to an individual substance of silica fume, so that the mixed substance should be dispersed in a similar manner as the silica fume was. A mixed substance with cement comprises liquid-phase content similar to the cement extraction liquid, however, the liquid-phase content shown in FIG. 7 does not influence the dispersion of the silica fume. Therefore, the fact that the mixed substance of the cement and the silica fume is determined as the solid line in FIG. 9 which indicates that the silica fume coheres to the surface of the cement and coating thereof. However, a portion of the silica fume sticked together is dispersed forming cohered particles.

Figure 10:
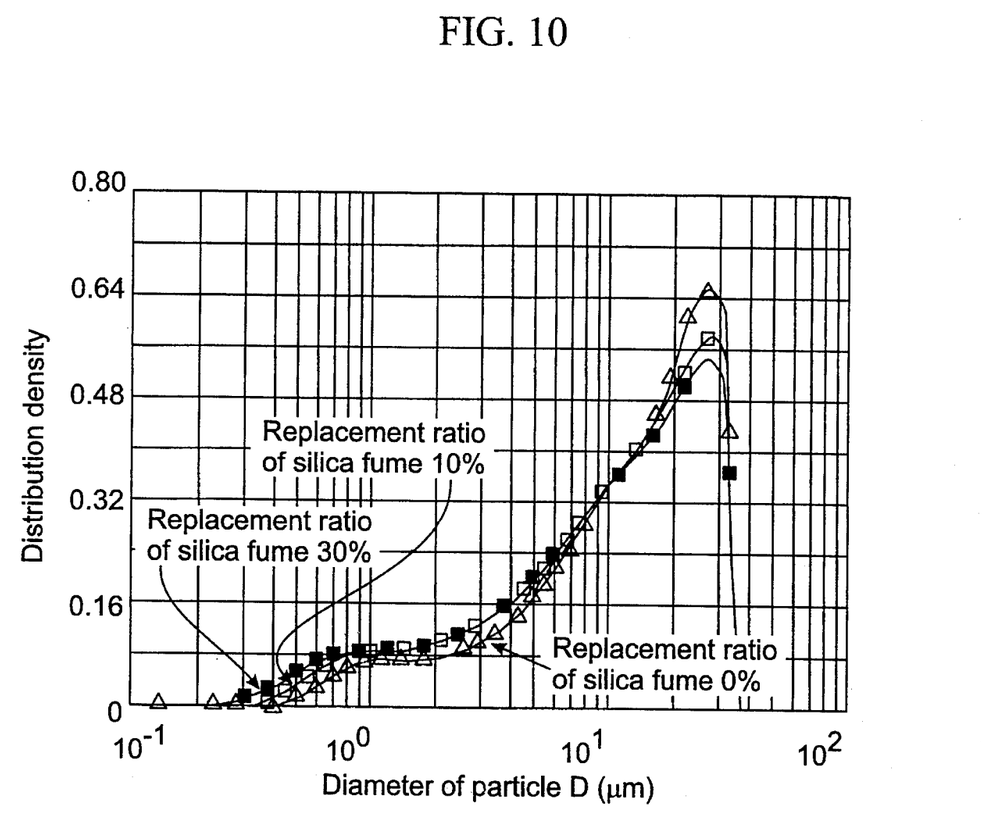
FIG. 10 shows a ditribution of mortar which is obtained by passing concrete, the ratio of combined substance with water thereof is 28% and the ratio of silica fume replacement thereof is 0–30%, through a sieve with the opening of 2.5 mm.
Figure 11:
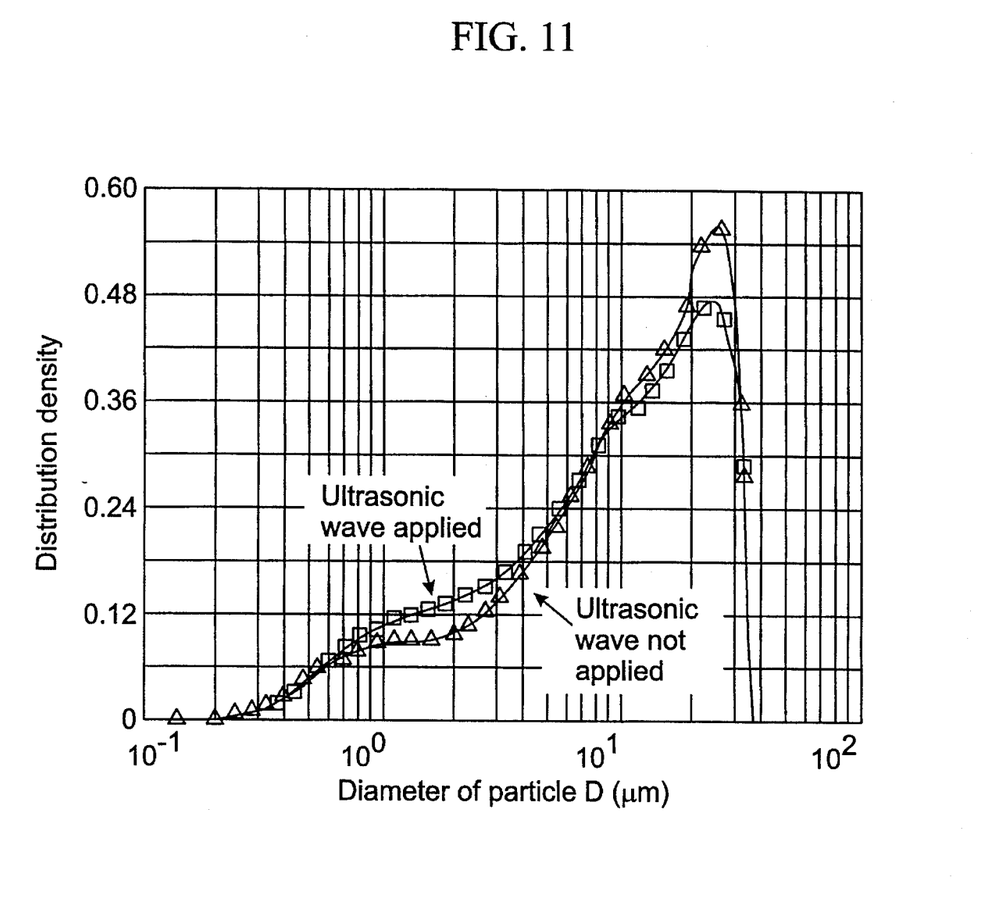
FIG. 11 shows a ditribution of mortar which is obtained by passing concrete, the ratio of combined substance with water thereof is 28% and the ratio of silica fume replacement thereof is 30%, through a sieve with the opening of 2.5 mm, and a ditribution of the mortar to which ultrasonic wave is applied.

FIG. 10 shows a test result measured as such that the concrete of No. 2 indicated in the diagram shown previously is displaced with silica fume by a ratio of 0%, 10% and 30%, and each of them are mixed in the manner described above, and the concrete right after mixing is passed through a 2.5 mm sieve sift, and the particle size thereof is measured. According to the concrete comprising the silica fume, particles less than 1 μm slightly incresed compared to the concrete comprising no silica fume, however, it does not indicate the peak as seen in FIG. 6, which is normally observed when silica fume dispersed. The distributions of the particle size at 10% and 30% replacement are unchanged. The distribution of particle size of the substance comprising this silica fume is almost similar to that of the mixed substance of cement and silica fume shown in FIG. 9. FIG. 11 shows a couple of distributions of particle size; one is measured as such that 0.4 gram of mortar, which is passed throuhg a 2.5 mm sieve sift, is applied in a beaker filled with 100 cc of water and 600 watt of ultrasonic wave is applied thereto by a homogenizer for a minute, and the other is measured without receiving the ultrasonic wave. A remarkable effect of the ultrasonic wave is not observed. The concrete shown in FIG. 11 is the mixed one as indicated No. 2 in the diagram shown previously, the replacement of the silica fume is 30%.

Those test results indicate that the cement can be coated by the silica fume even in water, which is a particular characteristic of the present invention.

As described above, the hydraulic substance according to the present invention comprises hydraulic particles and fine particles, ⅕ smaller in size than the particles, and they are stirred and mixed in water to coat the particles by the fine particles. Then, angular particles like cement is covered by fine particles like bearings, so that the shearing resistance thereof decreases and the fluidity of the hydraulic substance improves. By lowering the ratio of the water against the particles or the paste against other substance, the efficiency of the hydraulic substance can be improved. By applying the high-range water reducer, the ratio of the water against the hydraulic particles can be further lowered, so that without a process of making the angular cement globular, the fluidity thereof can be improved, which is effective for saving energy and decreasing the cost.

We claim:

1. A hydraulic material comprising water, solid particles A comprising portland cement, and solid particles B comprising silica fume, wherein an average diameter of said solid particles A is from 5 to 50 μm, an average diameter of said solid particles B is less than ⅕ the average diameter of said solid particles A, said solid particles B cohering to the surfaces of said solid particles A in said water, the quantity of said solid particles B being such that there are enough of said solid particles B to entirely coat said solid particles A with at least a single layer of said solid particles B, thereby direct contact between solid particles A being restrained, and the fluidity of said hydraulic substance prior to hydration being improved by bearing effect and electrical repulsive effect of said solid particles B, the quantity of said water being less than 60% of the total weight of said solid particles A and said solid particles B.

2. A hydraulic material comprising water, solid particles A, and solid particles B, wherein an average diameter of said solid particles A is from 5 to 50 μm, an average diameter of said solid particles B is less than ⅕ the average diameter of said solid particles A, said solid particles B cohering to the surfaces of said solid particles A in said water, the quantity of said solid particles B being such that there are enough of said solid particles B to coat at least part of the surfaces of said particles A, with at least a single layer, thereby direct contact between solid particles A being restrained, and the fluidity of said hydraulic material prior to hydration being improved by bearing effect and electrical repulsive effect of said solid particles B, the quantity of said water being less than 60% of the total weight of said solid particles A and said solid particles B.

3. A hydraulic material as claimed in claim 1, wherein at least some of said solid particles A are entirely surface coated with at least a single layer of said solid particles B.

4. A hydraulic material as claimed in claim 1, wherein at least some of said solid particles A are at least partially surface coated with at least a single layer of said solid particles B.

5. A hydraulic material as claimed in claim 1, wherein at least some of said solid particles B are evenly dispersed in gaps between said solid particles A.

6. A hydraulic material as claimed in claim 1, further comprising a quantity of high-range water reducer for dispersing said solid particles A and said solid particles B so as to increase fluidity.

7. A hydraulic material as claimed in claim 1, further comprising a substance C, larger than said solid particles A, wherein said material C comprises sand, stone, artificial lightweight aggregate, an inorganic formed material, an inorganic sintered material, plastic, an organic formed material, a hollow plastic material, inorganic fiber, organic fiber, or metal fiber.

8. A hydraulic material as claimed in claim 1, wherein said solid particles A comprise at least 20 weight % of portland cement.

9. A hydraulic material as claimed in claim 1, wherein said solid particles B comprise silica fume comprising more than 60 weight % of $SiO_2$, and the specific surface area of said silica fume is from 50,000 to 1,000,000 $cm^2/g$.

10. A hydraulic material as claimed in claim 9, made by a process wherein 0.2 gram of said silica fume and 250 ml of distilled water are mixed together in an ultrasonic wave dispersion tub attached to a laser diffraction particle distribution measurement device having a generating power of at least 150 watts and a frequency of 20 kHz, so that when ultrasonic wave energy is applied for 12 minutes, more than 30 weight % of said silica fume is dispersed to particles of less than 1 μm in diameter.

* * * * *